United States Patent
Hiruma

(10) Patent No.: US 8,511,416 B2
(45) Date of Patent: Aug. 20, 2013

(54) MOTOR SUPPORTING STRUCTURE

(75) Inventor: Atsushi Hiruma, Atsughi (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 177 days.

(21) Appl. No.: 13/203,120

(22) PCT Filed: Jan. 27, 2010

(86) PCT No.: PCT/JP2010/051043
§ 371 (c)(1),
(2), (4) Date: Aug. 24, 2011

(87) PCT Pub. No.: WO2010/098165
PCT Pub. Date: Sep. 2, 2010

(65) Prior Publication Data
US 2011/0308877 A1  Dec. 22, 2011

(30) Foreign Application Priority Data

Feb. 27, 2009  (JP) .................................. 2009-046945
Nov. 11, 2009  (JP) .................................. 2009-257850

(51) Int. Cl.
*B60K 5/12*  (2006.01)
(52) U.S. Cl.
CPC ........................................ *B60K 5/12* (2013.01)
USPC ........................................ 180/299; 180/291
(58) Field of Classification Search
CPC ................................. B60K 5/12; B60K 5/1216
USPC .............................. 180/291, 299, 65.1, 65.22
See application file for complete search history.

(56) References Cited

U.S. PATENT DOCUMENTS 4,753,315 A * 6/1988 Fujisaki et al. ............... 180/299
5,074,374 A * 12/1991 Ohtake et al. ................. 180/312
5,096,010 A * 3/1992 Ojala et al. .................... 180/68.3

(Continued)

FOREIGN PATENT DOCUMENTS

DE  40 25 031 A1  2/1991
EP   1 386 827 A2   2/2004

(Continued)

*Primary Examiner* — J. Allen Shriver, II
*Assistant Examiner* — Jacob Meyer
(74) *Attorney, Agent, or Firm* — Foley & Lardner LLP

(57) ABSTRACT

A motor supporting structure including: a vehicle body member; side frames which extend in a vehicle forward and backward direction below the vehicle body member; cross frames which extend in a vehicle left and right direction below the vehicle body member and are connected to the front end sides and rear end sides of the side frames; frame supporting members which are fixed to cross portions and elastically support the side frames and cross frames by way of elastic bodies, wherein the cross portions are defined as portions where the side frames and the cross frames meet with each other when seen from above the vehicle body; a motor which is disposed in an area surrounded by the side frames and cross frames when seen from above the vehicle body; a motor supporting member for elastically supporting the front side of the motor by fixing the front side of the motor to both side frames and the front cross frame by way of an elastic body; a side frame side connecting member for connecting the side frame with the motor supporting member, to thereby fix the motor supporting member to the side frame; and a cross frame side connecting member for connecting the front cross frame with the motor supporting member, to thereby fix the motor supporting member to the front cross frame.

9 Claims, 6 Drawing Sheets

(56) References Cited

U.S. PATENT DOCUMENTS

| | | | |
|---|---|---|---|
| 5,740,876 A * | 4/1998 | Shimose et al. | 180/232 |
| 6,085,858 A * | 7/2000 | Wakana et al. | 180/300 |
| 6,109,654 A * | 8/2000 | Yamamoto et al. | 280/784 |
| 6,371,229 B1 * | 4/2002 | Kakiuchi | 180/65.25 |
| 6,708,793 B2 * | 3/2004 | Witherspoon et al. | 180/291 |
| 6,843,524 B2 * | 1/2005 | Kitagawa | 296/187.09 |
| 6,959,922 B2 * | 11/2005 | Miyahara | 267/140.3 |
| 6,988,579 B2 * | 1/2006 | Miyahara | 180/299 |
| 6,997,276 B2 * | 2/2006 | Yoshida et al. | 180/232 |
| 7,032,701 B2 * | 4/2006 | Yoshida et al. | 180/291 |
| 7,232,005 B2 * | 6/2007 | Komatsu et al. | 180/299 |
| 7,393,016 B2 * | 7/2008 | Mitsui et al. | 280/784 |
| 7,445,076 B2 * | 11/2008 | Shigematsu | 180/299 |
| 7,490,691 B2 * | 2/2009 | Reese et al. | 180/299 |
| 7,562,737 B2 * | 7/2009 | Miyahara et al. | 180/291 |
| 7,575,087 B2 * | 8/2009 | Kim | 180/299 |
| 7,588,117 B2 * | 9/2009 | Fukuda | 180/291 |
| 7,810,819 B2 * | 10/2010 | Lamers et al. | 280/5.516 |
| 8,083,243 B2 * | 12/2011 | Hamada et al. | 280/124.1 |
| 2002/0096384 A1 * | 7/2002 | Yoshida et al. | 180/298 |
| 2005/0079068 A1 * | 4/2005 | Shigematsu | 417/363 |
| 2006/0144631 A1 * | 7/2006 | Kim | 180/299 |
| 2007/0051549 A1 * | 3/2007 | Fukuda | 180/232 |
| 2012/0292124 A1 * | 11/2012 | Yamashita et al. | 180/291 |

FOREIGN PATENT DOCUMENTS

| | | | |
|---|---|---|---|
| JP | 7-81429 | A | 3/1995 |
| JP | 7-117725 | A | 5/1995 |
| JP | 8-310252 | A | 11/1996 |
| JP | 9-150635 | A | 6/1997 |
| JP | 3003485 | B2 | 1/2000 |
| JP | 2000-120770 | A | 4/2000 |
| JP | 3150758 | B2 | 3/2001 |
| JP | 2001-105893 | A | 4/2001 |
| JP | 3214220 | B2 | 10/2001 |
| JP | 2002-274195 | A | 9/2002 |
| JP | 2002-370544 | A | 12/2002 |
| JP | 3375788 | B2 | 2/2003 |
| JP | 2004-161260 | A | 6/2004 |
| JP | 2004-276764 | A | 10/2004 |
| JP | 2004-314803 | A | 11/2004 |
| JP | 3674145 | B2 | 7/2005 |
| JP | 2006-088871 | A | 4/2006 |
| JP | 2006-117011 | A | 5/2006 |
| JP | 2007-022276 | A | 2/2007 |
| JP | 2007-331634 | A | 12/2007 |
| JP | 2008-055970 | A | 3/2008 |
| JP | 4321199 | B2 | 8/2009 |

* cited by examiner

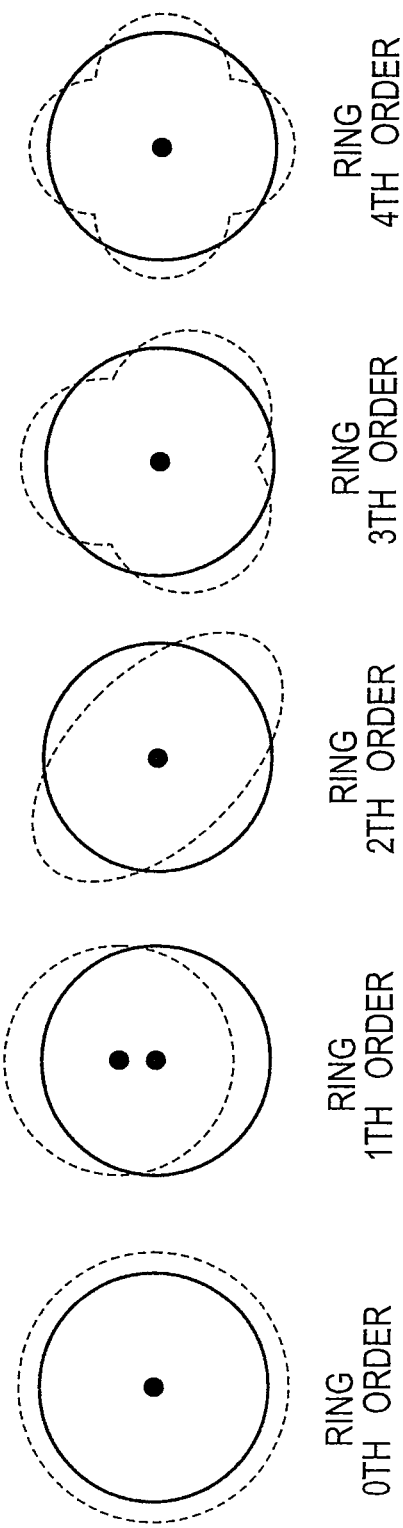

MOTOR SUPPORTING STRUCTURE

TECHNICAL FIELD

The present invention relates to a motor supporting structure.

BACKGROUND ART

In a conventional mount structure of a power train including an engine and a transmission, right and left side frames are connected with each other by a front cross member and a suspension cross member and engine mounts disposed at the right and left side frames and suspension cross member support the power train (refer to Patent Literature 1).

CITATION LIST

Patent Literature

[Patent Literature 1] Japanese Patent Application Laid-Open No. 2000-120770

SUMMARY OF INVENTION

Technical Problem

Compared with vibration of an engine, vibration of a motor extends to a high frequency range. Therefore, mounting a motor with a mount structure for mounting an engine may excite a natural vibration of the side frame or suspension cross member in the high frequency range which is not expected to be caused by the engine, thus quality of quietness or vibration damping characteristics, as the case may be, is degraded.

It is an object of the present invention to suppress the degrading of quality of quietness or vibration damping characteristics which may be caused when a motor is adopted for a power train.

Solution to Problem

For achieving the above object, a motor supporting structure of the present invention includes: a vehicle body member which is a part of a vehicle body; a left side frame and a right side frame which extend in a vehicle forward and backward direction below the vehicle body member; a front cross frame and a rear cross frame which extend in a vehicle left and right direction below the vehicle body member and are connected to front end sides and back end sides of the left and right side frames; frame supporting members fixed, when viewed from above the vehicle body, to cross portions which are defined as portions where the side frames and the cross frames meet with each other, the frame supporting members being adapted to elastically support the side frames and cross frames by way of elastic bodies included in the frame supporting members; a motor for driving a vehicle which is disposed, when viewed from above the vehicle body, in an area surrounded by the left and right side frames and the front and rear cross frames; a motor supporting member for elastically supporting a front side of the motor by fixing the front side of the motor to a side frame of the side frames and the front cross frame by way of an elastic body included in the motor supporting member; a side frame side connecting member for connecting the side frame with the motor supporting member, to thereby fix the motor supporting member to the side frame; and a cross frame side connecting member for connecting the front cross frame with the motor supporting member, to thereby fix the motor supporting member to the front cross frame.

Advantageous Effects of Invention

With the motor supporting structure according to the present invention, vibration of a motor is transmitted and dispersed to side frames and a cross frame through motor supporting members, side frame side connecting members and cross frame side connecting members, thereby suppressing vibration transmission to a vehicle body member. Thus, the degrading of quality of quietness or vibration damping characteristics, which is observed when the motor instead of an engine is used for driving a vehicle, can be prevented.

BRIEF DESCRIPTION OF DRAWINGS

FIG. 7 is a diagram explaining about ring modes.

DESCRIPTION OF EMBODIMENTS

Figure 1:
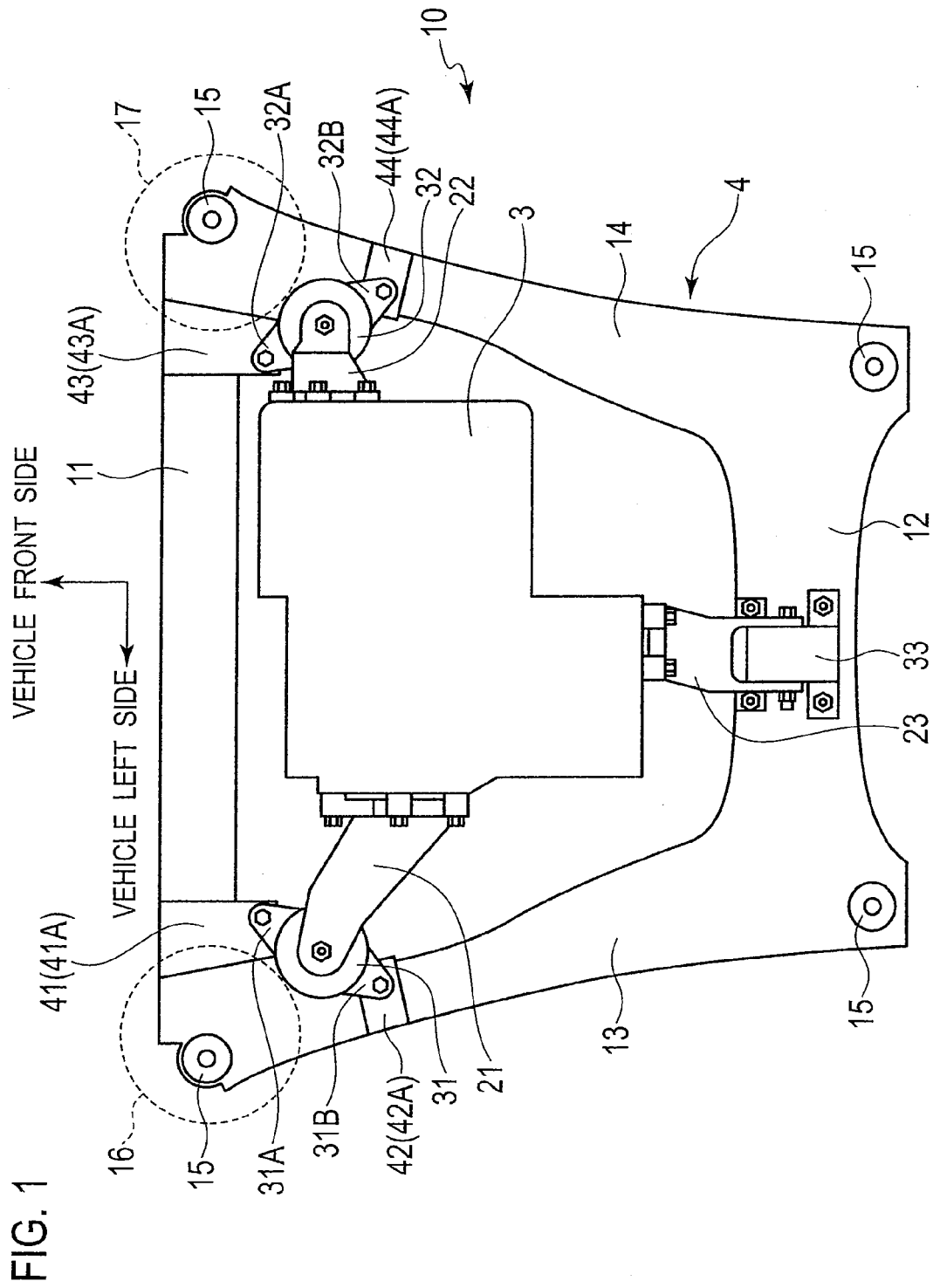
FIG. 1 is a plan view of a motor supporting structure.
Figure 2:
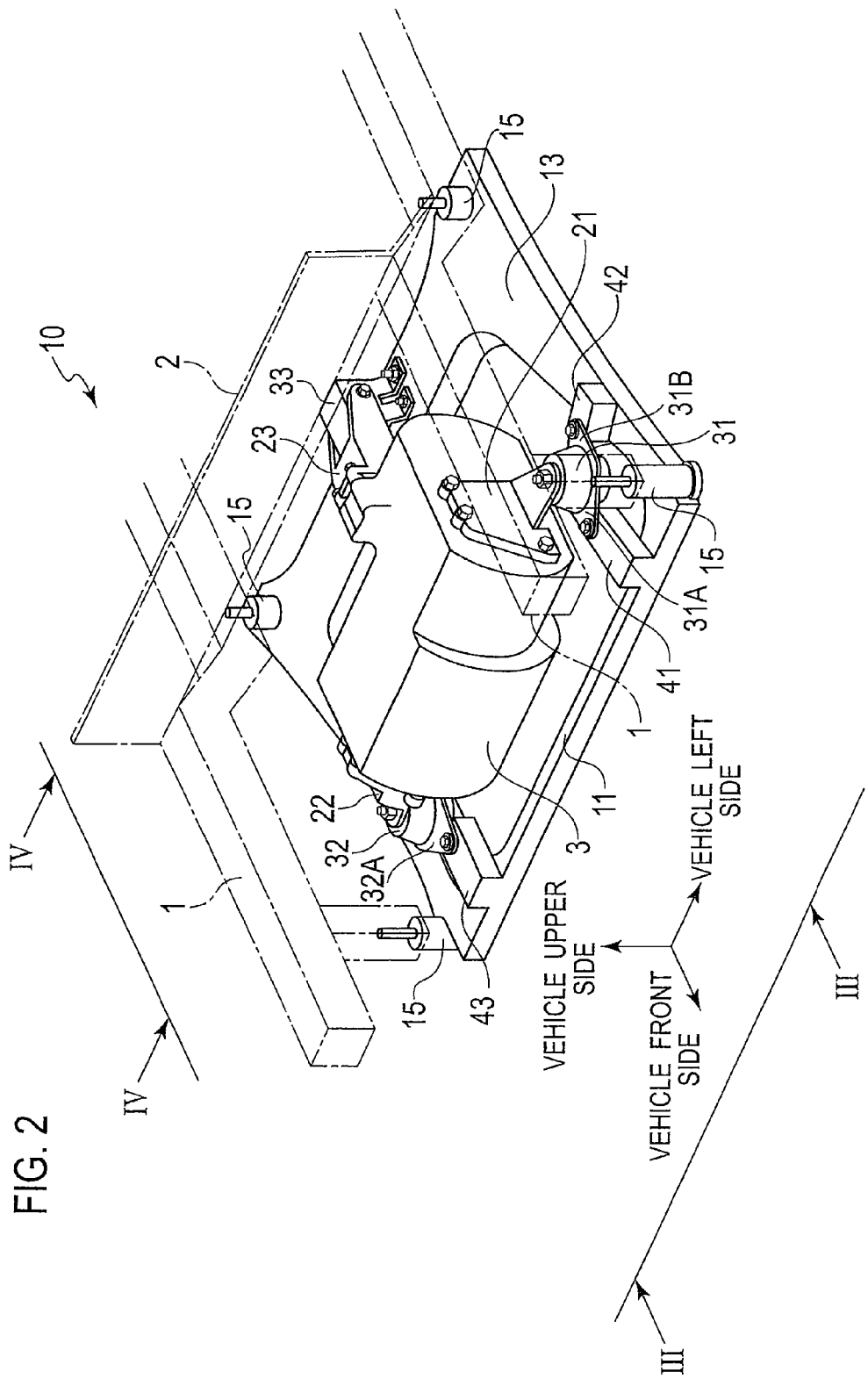
FIG. 2 is a perspective view of the motor supporting structure.

Hereinafter, an embodiment of the present invention is to be set forth based on drawings.
<Structure>
FIG. 1 is a plan view of a motor supporting structure 10.
FIG. 2 is a perspective view of the motor supporting structure 10.

A pair of a right side front side member 1 and a left side front side member 1 extend in a forward-and-backward direction of a vehicle body, where each of the right and left side members 1, 1 is bent or curved such that the rear part of each of the right and left side members 1, 1 is located under a dash panel 2. There is provided a sub-frame 4 to which a motor 3 for driving a vehicle is mounted, where the sub-frame 4 is square frame-shaped in plan view and is disposed under the front side members 1, 1. The motor 3 constitutes a rotational driving source of a power train and is disposed in a region which is, when viewed from above the vehicle, surrounded by the square frame-shaped sub-frame 4.

The square frame-shaped sub-frame 4 has a loop structure formed by providing (connecting) a front cross frame 11 and a rear cross frame 12 each of which extends in a right-and-left direction of the vehicle body and a left side frame 13 and a right side frame 14 each of which extends in the forward-and-backward direction of the vehicle body such that such frames 11, 13, 12 and 14 are linked in series in this order. The square frame-shaped sub-frame 4 has four corners, that is, a cross portion between the front cross frame 11 and the left side frame 13, a cross portion between the left side frame 13 and the rear cross frame 12, a cross portion between the rear cross frame 12 and the right side frame 14, and a cross portion between the right side frame 14 and the front cross frame 11, where each of the four corners is elastically supported on a lower face of the front side member 1 by means of an insulator 15. The insulators 15 on the four corners are so set that the difference in rigidity between the insulators 15 on right side and the insulators 15 on left side is smaller than the difference in rigidity between the insulators 15 on front side and the insulators 15 on rear side.

Herein, the cross portion is a portion where the front and rear cross frames 11, 12 meet the left and right side frames 13, 14. According to the embodiment, the cross portion is defined as an area where an area A1 (where the front cross frame 11 extends in the vehicle right-and-left direction with a width thereof in the vehicle forward-and-backward direction kept) overlaps with an area B1 (where the left side frame 13 extends in the vehicle forward-and-backward direction with a width thereof in the vehicle right-and-left direction kept) when such areas A1 and B1 are viewed from above the vehicle body. Moreover, the cross portion is defined as an area where the area A1 overlaps with an area B2 (where the right side frame 14 extends in the vehicle forward-and-backward direction with a width thereof in the vehicle right-and-left direction kept) when such areas A1 and B2 are viewed from above the vehicle body. Moreover, the cross portion is defined as an area where an area A2 (where the rear cross frame 12 extends in the vehicle right-and-left direction with a width thereof in the vehicle forward-and-backward direction kept) overlaps with the area B1 when such areas A2 and B1 are viewed from above the vehicle body. Moreover, the cross portion is defined as an area where the area A2 overlaps with the area B2 when such areas A2 and B2 are viewed from above the vehicle body. Moreover, the square frame-shaped sub-frame 4 may be formed by forming the front and rear cross frames 11, 12 separately from the left and right side frames 13, 14 and then joining them, or may be formed by forming the front and rear cross frames 11, 12 integrally with the left and right side frames 13, 14.

A left side face of the motor 3 is elastically supported to the sub-frame 4 by way of a left side bracket 21 and a left side insulator 31 (first motor supporting member). Moreover, a right side face of the motor 3 is elastically supported to the sub-frame 4 by way of a right side bracket 22 and a right side insulator 32 (second motor supporting member). Moreover, a rear side face of the motor 3 is elastically supported to the sub-frame 4 by way of a rear side bracket 23 and a rear side insulator 33 (third motor supporting member). The left, right and rear side insulators 31, 32, 33 each have an elastic body and elastically support the motor 3 by means of the elastic body. The rear side insulator 33's fixing point to the motor 3 is disposed on an upper side relative to the left and right side insulators 31, 32's fixing points to the motor 3.

In plan view, the left side insulator 31 is supported at two points on the front cross frame 11 and left side frame 13 with a first end side flange 31A connected to the front cross frame 11 and a second end side flange 31B connected to the left side frame 13. The left side insulator 31 thereby elastically supports the motor 3 between the first end side (first end side flange 31A) and second end side (second end side flange 31B) of the left side insulator 31. The left side insulator 31 supports the motor 3 at a position close to the cross portion 16 between the front cross frame 11 and the left side frame 13, that is, on a left end side of the front cross frame 11 and on a front end side of the left side frame 13.

On a left end side of the front cross frame 11, there is formed a rearward protruding portion 41 protruding toward the left side insulator 31, that is, toward inside (vehicle body rear side) of the sub-frame 4, where the first end side flange 31A of the left side insulator 31 is connected to the front cross frame 11 by the rearward protruding portion 41. On the other hand, on a front end side of the left side frame 13, there is formed a rightward protruding portion 42 protruding toward the left side insulator 31, that is, toward inside (vehicle body right side) of the sub-frame 4, where the second end side flange 31B of the left side insulator 31 is connected to the left side frame 13 by the rightward protruding portion 42.

In addition, the rearward protruding portion 41 may be formed integrally with the front cross frame 11 or may be so formed separately from the front cross frame 11 as to be connected to the front cross frame 11. Likewise, the rightward protruding portion 42 may be formed integrally with the left side frame 13 or may be so formed separately from the left side frame 13 as to be connected to the left side frame 13.

In plan view, the right side insulator 32 is supported at two points on the front cross frame 11 and right side frame 14 with a first end side flange 32A connected to the front cross frame 11 and a second end side flange 32B connected to the right side frame 14. The right side insulator 32 thereby elastically supports the motor 3 between the first end side (first end side flange 32A) and second end side (second end side flange 32B) of the right side insulator 32. The right side insulator 32 supports the motor 3 at a position close to the cross portion 17 between the front cross frame 11 and the right side frame 14, that is, on a right end side of the front cross frame 11 and on a front end side of the right side frame 14.

On a right end side of the front cross frame 11, there is formed a rearward protruding portion 43 protruding toward the right side insulator 32, that is, toward inside (vehicle body rear side) of the sub-frame 4, where the first end side flange 32A of the right side insulator 32 is connected to the front cross frame 11 by the rearward protruding portion 43. On the other hand, on a front end side of the right side frame 14, there is formed a leftward protruding portion 44 protruding toward the right side insulator 32, that is, toward inside (vehicle body left side) of the sub-frame 4, where the second end side flange 32B of the right side insulator 32 is connected to the right side frame 14 by the leftward protruding portion 44.

In addition, the rearward protruding portion 43 may be formed integrally with the front cross frame 11 or may be so formed separately from the front cross frame 11 as to be connected to the front cross frame 11. Likewise, the leftward protruding portion 44 may be formed integrally with the right side frame 14 or may be so formed separately from the right side frame 14 as to be connected to the right side frame 14.

The rear side insulator 33 is to be fixed to a substantially center of the rear cross frame 12.

Moreover, the left side insulator 31 is, when viewed from above the vehicle, disposed on one of two ends in the vehicle width direction on the front side of the motor 3, and is disposed in a position closer to the left side frame 13 than to the front cross frame 11. Likewise, the right side insulator 32 is, when viewed from above the vehicle, disposed on another of two ends in the vehicle width direction on the front side of the motor 3, and is disposed in a position closer to the right side frame 14 than to the front cross frame 11.

Moreover, the rearward protruding portion 41's connecting portion 41A connected to the front cross frame 11 is, compared with the rightward protruding portion 42's connecting portion 42A connected to the left side frame 13, disposed in a position closer to the cross portion 16. Likewise, the rearward protruding portion 43's connecting portion 43A connected to the front cross frame 11 is, compared with the leftward protruding portion 44's connecting portion 44A connected to the right side frame 14, disposed in a position closer to the cross portion 17.

Figure 3:
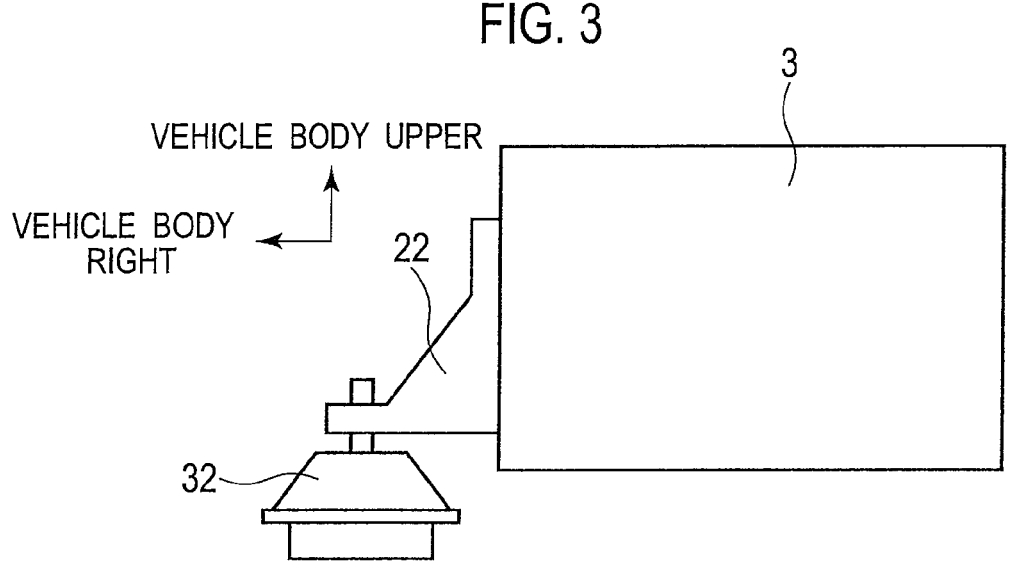
FIG. 3 is a vehicle front view showing a right side bracket.

FIG. 3 is a vehicle front view showing the right side bracket 22. That is, FIG. 3 is a cross sectional view which is viewed along the line III-III in FIG. 2.

The right side bracket 22 supports a right end portion in the vehicle width direction of the motor 3, instead of supporting a belly portion (lower face) of the motor 3.

Figure 4:
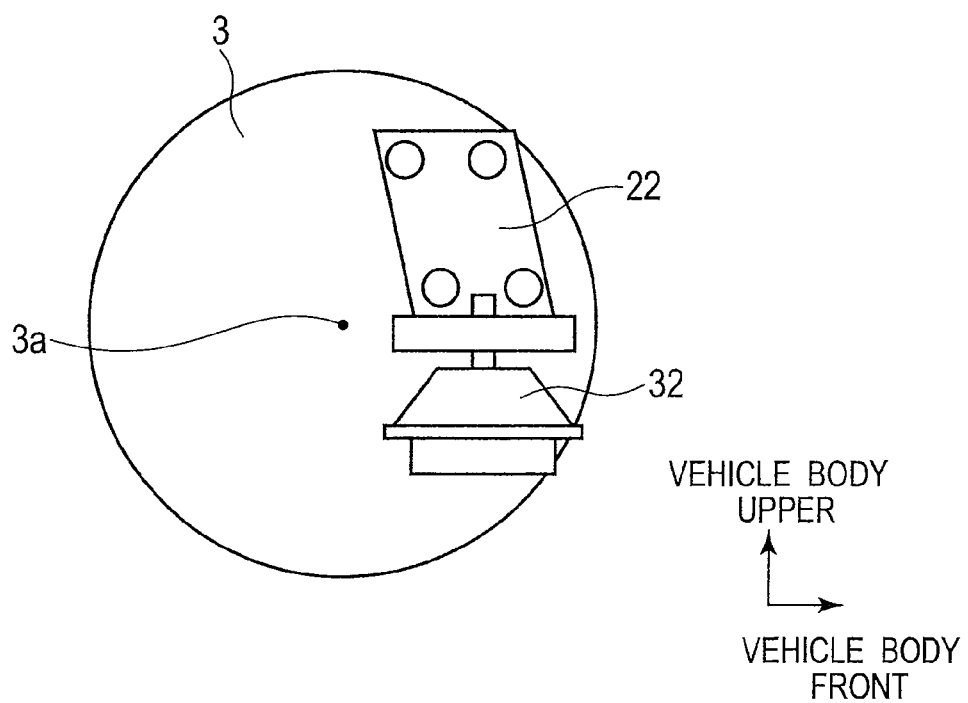
FIG. 4 is a vehicle right side view showing the right side bracket.

FIG. 4 is a vehicle right side view showing the right side bracket 22. That is, FIG. 4 is a cross sectional view which is viewed along the line IV-IV in FIG. 2.

The motor 3 has a motor rotational shaft 3a extending in the vehicle width direction, and the right side bracket 22 (right side insulator 32) supports a part of the right end portion in the vehicle width direction of the motor 3 at a position spaced apart radially from the motor rotational shaft 3a. Specifically, the right side bracket 22 (right side insulator 32) elastically supports a portion of the motor 3 which is on more vehicle body front side than the motor rotational shaft 3a.

In addition, although FIG. 3 and FIG. 4 explain about the right side bracket 22, the same may be likewise applied to the left side bracket 21 (left side insulator 31).

<Function>

Compared with vibration of an engine, the vibration of the motor 3 extends to a high frequency range. Therefore, mounting the motor 3 with a mount structure for mounting an engine may excite natural vibrations of the members such as the sub-frame 4, left side frame 13, right side frame 14 and the like in the high frequency range which is not expected to be caused by the engine, thus quality of quietness or vibration damping characteristics, as the case may be, is degraded.

According to the embodiment, the motor 3 is elastically supported by way of serially the left side bracket 21 and the left side insulator 31 to the cross portion 16 which is the sub-frame 4's portion having high rigidity. With this, the vibration of the motor 3 is transmitted and dispersed to the front cross frame 11 and to the left side frame 13. Likewise, according to the embodiment, the motor 3 is elastically supported by way of serially the right side bracket 22 and the right side insulator 32 to the cross portion 17 which is the sub-frame 4's portion having high rigidity. With this, the vibration of the motor 3 is transmitted and dispersed to the front cross frame 11 and to the right side frame 14. Since the vibrations are transmitted to the portions having high rigidity against bending mode, a bending mode deformation in the vehicle vertical direction is less likely to be excited, where such mode is an elastic primary mode of the front cross frame 11 and left side frame 13 (right side frame 14). That is, the vibration transmission to the vehicle body side through the front side member 1 is suppressed, thus making it possible to prevent the degrading of quality of quietness or vibration damping characteristics.

Figure 5:
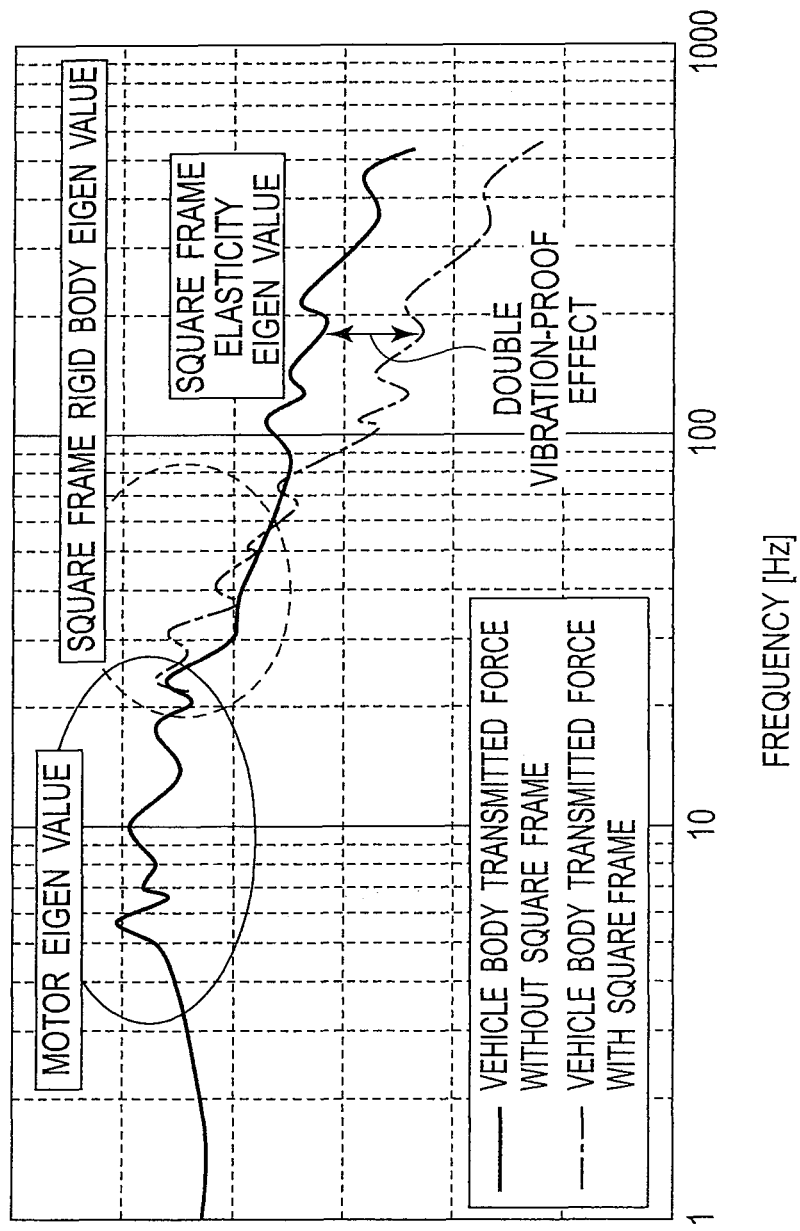
FIG. 5 shows vibration transmission to a vehicle body.

FIG. 5 shows vibration transmission to the vehicle body.

Positioning the cross portion 16 close to the insulator 15 allows the left side insulator 31 to be close to the insulator 15. Likewise, positioning the cross portion 17 close to the insulator 15 allows the right side insulator 32 to be close to the insulator 15. The two elastic bodies thus positioned close to each other can efficiently absorb the vibration from the motor 3. That is, as shown FIG. 5, since a double vibration damping effect can be obtained, the vibration transmission to the vehicle body side through the front side member 1 can be suppressed, thus making it possible to prevent the degrading of quality of quietness or vibration damping characteristics.

Moreover, since the left side insulator 31 is two-point supported in such a manner as to bypass the front cross frame 11 and the left side frame 13, the cross portion 16's bending rigidity in the vehicle vertical direction and the cross portion 16's natural vibration frequency can be increased. Thus, even when the vibration of the motor 3 is inputted, deformation of each of the front cross frame 11 and left side frame 13 is less likely to be excited, to thereby suppress vibration transmission to the vehicle body side through the front side member 1 and prevent the degrading of quality of quietness or vibration damping characteristics. Likewise, since the right side insulator 32 is two-point supported in such a manner as to bypass the front cross frame 11 and the right side frame 14, the cross portion 17's bending rigidity in the vehicle vertical direction and the cross portion 17's natural vibration frequency can be increased. Thus, even when the vibration of the motor 3 is inputted, deformation of each of the front cross frame 11 and right side frame 14 is less likely to be excited, to thereby suppress vibration transmission to the vehicle body side through the front side member 1 and prevent the degrading of quality of quietness or vibration damping characteristics.

Downsizing the motor 3 elongates a spaced-apart distance between the motor 3 and the front cross frame 11 and a spaced-apart distance between the motor 3 and the left side frame 13 (right side frame 14). Then, on the left end side (right end side) of the front cross frame 11, there is formed the rearward protruding portion 41 (rearward protruding portion 43) protruding toward the left side insulator 31 (right side insulator 32), while on the front side of the left side frame 13 (right side frame 14), there is formed the rightward protruding portion 42 (leftward protruding portion 44) protruding toward the left side insulator 31 (right side insulator 32). Then, the left side insulator 31 is connected to the rearward protruding portion 41 and the rightward protruding portion 42, while the right side insulator 32 is connected to the rearward protruding portion 43 and the leftward protruding portion 44. With this, even the downsizing of the motor 3 does not need to enlarge the left side bracket 21 (right side bracket 22) or does not need to change the mounting point of the left side insulator 31 (right side insulator 32), to thereby improve convenience. Especially, enlarging of the left side bracket 21 (right side bracket 22) decreases the effect of suppressing the vibration transmission due to the decrease of rigidity and natural vibration frequency, therefore, preventing enlargement of the left side bracket 21 (right side bracket 22) can prevent the degrading of quality of quietness or vibration damping characteristics.

Moreover, since the left and right side insulators 31, 32 (motor side supporting members) and the insulators 15 (unit body side elastic body) are disposed on a circumference of a rectangle formed by the leftward protruding portion 44 (side frame side connecting member), the rightward protruding portion 42 (side frame side connecting member), the rearward protruding portions 41, 43 (cross frame side connecting members), the left side frame 13 and the right side frame 14, the front cross frame 11 and the rear cross frame 12, and the cross portions (16, 17), the vibration of the motor 3 can be transmitted to the portions having rigidity against the bending mode, thereby suppressing the vibration transmission to the vehicle body member and making it possible to prevent the degrading of quality of quietness or vibration damping characteristics.

Moreover, the left side insulator 31 elastically supports the left side of the motor 3 while the right side insulator 32 elastically supports the right side of the motor 3. The insulators 15 on the four corners are so set that the difference in rigidity between the insulators 15 on right side and the insulators 15 on left side is smaller than the difference in rigidity between the insulators 15 on front side and the insulators 15 on rear side. Since the left side insulator 31 (right side insulator 32) is disposed close to the insulator 15, a rigidity which is a combination of the rigidity of the insulator 15 and the rigidity of the left side insulator 31 (right side insulator 32) acts on the vehicle body. Thus, disposing the left side insulator 31 (right side insulator 32) close to the right-and-left insulators 15, 15 having smaller rigidity difference reduces the combined rigidity's difference attributable to the position, where the combined rigidity is a combination of the rigidity of the insulator 15 and the rigidity of the left side insulator 31 (right side insulator 32). Thereby, in terms of supporting rigidity of the motor 3, deviation attributable to the position can be made smaller. Therefore, when the motor 3 rotates, the motor 3's rotation axis can be kept parallel to an axis in the vehicle right-and-left direction, whereby operation stability deterioration due to the motor 3's slanting relative to the axis in the vehicle right-and-left direction during the rotation of the motor 3 can be suppressed. Moreover, the vibration mode at which the motor 3 per se vibrates caused by the motor 3's vibration or an external input such as from road surface can be easily controlled, thus making it possible to prevent the degrading of quality of quietness or vibration damping characteristics.

Moreover, the left and right side insulators 31, 32 are each disposed on the front side of the motor 3. With this, the left and right side insulators 31, 32 can be fixed to the portions close to the respective cross portions 16, 17 where the rigidity is high in the sub-frame 4, thus making it possible to suppress the degrading of quality of quietness or vibration damping characteristics.

Moreover, each of the left and right side insulators 31, 32 is disposed on either end side in the vehicle width direction in the motor 3. With this, when the vehicle front portion is deformed backward due to a contact with an obstacle, the left and right side insulators 31, 32's interference with the motor 3 can be prevented. That is, without lowering an effect of absorbing an energy in the contact, the front side member 1 and the sub-frame 4 allow each of the left and right side insulators 31, 32 to effectively absorb the energy at the contact.

Moreover, each of the left and right side insulators 31, 32 is disposed in a position closer to the left and right side frames 13, 14 than to the front cross frame 11. The front cross frame 11 is, as the case may be, so set for protecting pedestrian that the rigidity of the front cross frame 11 is not too high. In this case, the left and right side frames 13, 14 are higher in rigidity than the front cross frame 11. Thus, disposing the left and right side insulators 31, 32 close to the left and right side frames 13, 14 having higher rigidity can decrease displacement of the left and right side insulators 31, 32, thus making it easy for them to absorb vibration.

Moreover, in the sub-frame 4, the connecting portions 41A, 43A of the respective rearward protruding portions 41, 43 are, compared with the connecting portions 42A, 44A of the respective rightward and leftward protruding portions 42, 44, disposed closer to the cross portions 16, 17, thus making it possible to suppress the vibration transmission to the front cross frame 11 having a relatively low rigidity. Thus, the insulators 15 disposed at the cross portions 16, 17 can effectively absorb the vibration. Conversely speaking, to an amount equivalent to the above, the rigidity of the front cross frame 11 can be reduced for protecting pedestrian.

Figure 6:
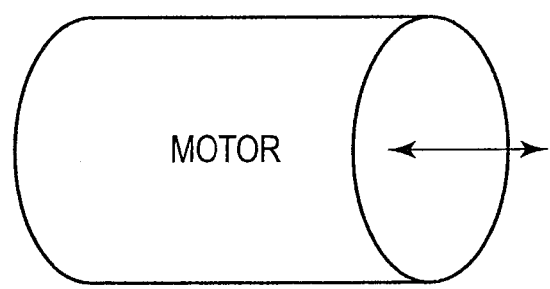
FIG. 6 is a diagram explaining about a drum mode.

FIG. 6 is a diagram explaining about a drum mode.

FIG. 7 is a diagram explaining about ring modes.

In the motor 3, the ring mode and drum mode are vibration modes having a great influence on vehicle noise-vibration performance. In the ring mode, a ring expands or shrinks; while in the drum mode, a membrane resonance occurs like a drum. Thus, for avoiding as much as possible the influence by the ring mode, it is preferable that a position for fixing the right side bracket 22 (mount position) should not be disposed in a belly portion (lower face) of the motor 3. Moreover, for avoiding as much as possible the influence by the drum mode, it is preferable that a position for fixing the right side bracket 22 (mount position) should not be disposed in the vicinity of the motor rotational shaft 3a.

Then, the right side bracket 22 at first supports the right end portion in the vehicle width direction (refer to FIG. 3). With this, mainly, an influence of the exciting vibration in the ring mode can be relieved. Moreover, the right side bracket 22 supports a part of the right end portion in the vehicle width direction of the motor 3 at the position spaced apart in the radial direction from the motor rotational shaft 3a (refer to FIG. 4). With this, mainly, an influence of the exciting vibration in the drum mode can be relieved. In addition, supporting a portion which is on more vehicle body front side than the motor rotational shaft 3a can downsize the right side insulator 32.

Moreover, the two insulators (left side insulator 31 and right side insulator 32) which are disposed on the front side of the motor 3 and the one insulator (rear side insulator 33) which is disposed on the rear side of the motor 3 implement mounting of the motor 3 at three portions, thus making it possible to stably support the motor 3.

Moreover, the rear side insulator 33's fixing point to the motor 3 is disposed on an upper side relative to the left and right side insulators 31, 32's fixing points to the motor 3. With this, the left and right side insulators 31, 32 which support the motor 3 from the lower side and the rear side insulator 33 which supports the motor 3 from the upper side can effectively absorb the vertical vibration of the motor 3.

According to the embodiment, the insulators which are supported at two points by the cross frame and the side frame are disposed at two portions, however, the present invention is not limited to this. The insulator(s) may be disposed at only one portion or at three portions.

As set forth above, the motor 3 corresponds to "motor," the front side member 1 corresponds to "vehicle body member," the front cross frame 11 and the rear cross frame 12 correspond to "cross frame," and the left side frame 13 and the right side frame 14 correspond to "side frame." Moreover, the insulator 15 corresponds to "frame supporting member," the cross portions 16, 17 correspond to "cross portion," the insulators 31, 32 correspond to "motor supporting members," the insulator 31 corresponds to "first motor supporting member," and the insulator 32 corresponds to "second motor supporting member." Moreover, the rearward protruding portions 41, 43 corresponds to "cross frame side connecting member," and the rightward protruding portion 42 and the leftward protruding portion 44 each correspond to "side frame side connecting member." Moreover, the insulator 33 corresponds to "third motor supporting member."

(1) A motor supporting structure includes: a vehicle body member which is a part of a vehicle body; a left side frame and a right side frame which extend in a vehicle forward and backward direction below the vehicle body member; a front cross frame and a rear cross frame which extend in a vehicle left and right direction below the vehicle body member and are connected to front end sides and back end sides of the left and right side frames; frame supporting members fixed, when viewed from above the vehicle body to cross portions which are defined as portions where the side frames and the cross frames meet with each other, the frame supporting members being adapted to elastically support the side frames and cross frames by way of elastic bodies included in the frame supporting members; a motor for driving a vehicle which is disposed, when viewed from above the vehicle body, in an area surrounded by the left and right side frames and the front and rear cross frames; a motor supporting member for elastically supporting a front side of the motor by fixing the front side of the motor to a side frame of the side frames and the front cross frame by way of an elastic body included in the motor supporting member; a side frame side connecting member for connecting the side frame with the motor supporting member, to thereby fix the motor supporting member to the side frame; and a cross frame side connecting member for connecting the front cross frame with the motor supporting member, to thereby fix the motor supporting member to the front cross frame.

With this, the vibration of the motor is transmitted and dispersed to the side frames and the cross frame through the motor supporting member, the side frame side connecting member and the cross frame side connecting member, thereby suppressing vibration transmission to the vehicle body member. Thus, the degrading of quality of quietness or vibration damping characteristics, which is observed when the motor instead of an engine is used for driving a vehicle, can be prevented.

(2) The motor supporting member is disposed, when viewed from above the vehicle body, on the front side of the motor.

With this, the motor supporting member can be fixed to a position close to the cross portion having high rigidity, thus making it possible to suppress the degrading of quality of quietness or vibration damping characteristics.

(3) The motor supporting member is disposed, when viewed from above the vehicle body, on one end side of the motor in a vehicle width direction.

With this, when the vehicle front portion has a contact with an obstacle, the motor supporting member's interference with the motor 3 can be prevented, that is without lowering an effect of absorbing an energy in the contact, the vehicle body member, the cross frame and the side frame can effectively absorb the energy at the contact.

(4) The motor supporting member is disposed in a position closer to the side frame than to the front cross frame.

With this, displacement of the motor supporting member can be decreased, thus making it easy to absorb vibration.

(5) A connecting portion of the cross frame side connecting member to the front cross frame is disposed, compared with a connecting portion of the side frame side connecting member to the side frame, in a position closer to a cross portion of the cross portions.

With this, vibration transmission to the front cross frame having a relatively low rigidity is decreased as much as possible, thereby efficiently transmitting the vibration to the elastic body of the frame supporting member, thus making it possible to efficiently absorb the vibration. Moreover, rigidity of the front cross frame can be reduced for protecting pedestrian.

(6) The motor has a motor rotational shaft in the vehicle width direction, and the motor supporting member elastically supports a part of an end portion in the vehicle width direction of the motor at a position spaced apart radially from the motor rotational shaft.

With this, an exciting vibration's influence caused by deformation of an end portion of the motor in the vehicle width direction or deformation of the other portions of the motor can be prevented, thus making it possible to relieve vibration transmission.

(7) The motor supporting member elastically supports, when viewed from above the vehicle body, a portion of the motor which is on more vehicle body front side than the motor rotational shaft.

With this, the motor supporting member can be downsized.

(8) The motor supporting members include: a first motor supporting member fixed to both of the left side frame and the front cross frame, a second motor supporting member fixed to both of the right side frame and the front cross frame, and the motor supporting structure further includes a third motor supporting member which is fixed to the rear cross frame and elastically supports a rear side of the motor by way of an elastic body included in the third motor supporting member.

With this, a small number of support members can stably support the motor.

(9) A fixing point of the third supporting member to the motor is disposed on an upper side relative to a fixing point of each of the first and second supporting members to the motor.

With this, a vertical vibration of the motor can be effectively absorbed.

The entire contents of the Japanese Patent Application Laid-Open No. 2009-046945 (filed on Feb. 27, 2009) and Japanese Patent Application Laid-Open No. 2009-257850 (filed on Nov. 11, 2009) are incorporated herein by reference in order to take protection against translation errors or omitted portions.

INDUSTRIAL APPLICABILITY

With the motor supporting structure according to the present invention, the vibration of the motor is transmitted and dispersed to the side frames and the cross frame through the motor supporting members, the side frame side connecting members and the cross frame side connecting members, thereby suppressing vibration transmission to the vehicle body member. Thus, the degrading of quality of quietness or vibration damping characteristics, which is observed when the motor instead of an engine is used for driving a vehicle, can be prevented.

The invention claimed is:
1. A motor supporting structure comprising:
a vehicle body member which is a part of a vehicle body;
a left side frame and a right side frame which extend in a vehicle forward and backward direction below the vehicle body member;
a front cross frame and a rear cross frame which extend in a vehicle left and right direction below the vehicle body member and are connected to front end sides and back end sides of the left and right side frames;
frame supporting members fixed, when viewed from above the vehicle body, to cross portions which are defined as portions where the side frames and the cross frames meet with each other, the frame supporting members being adapted to elastically support the side frames and cross frames by way of elastic bodies included in the frame supporting members;
a motor for driving a vehicle which is disposed, when viewed from above the vehicle body, in an area surrounded by the left and right side frames and the front and rear cross frames;
a motor supporting member for elastically supporting a front side of the motor by fixing the front side of the motor to a side frame of the side frames and the front cross frame by way of an elastic body included in the motor supporting member;
a side frame side connecting member for connecting the side frame with the motor supporting member, to thereby fix the motor supporting member to the side frame; and
a cross frame side connecting member for connecting the front cross frame with the motor supporting member, to thereby fix the motor supporting member to the front cross frame.
2. The motor supporting structure according to claim 1 wherein the motor supporting member is disposed, when viewed from above the vehicle body, on the front side of the motor.

3. The motor supporting structure according to claim 1 wherein the motor supporting member is disposed, when viewed from above the vehicle body, on one end side of the motor in a vehicle width direction.

4. The motor supporting structure according to claim 1 wherein the motor supporting member is disposed in a position closer to the side frame than to the front cross frame.

5. The motor supporting structure according to claim 1 wherein a connecting portion of the cross frame side connecting member to the front cross frame is disposed, compared with a connecting portion of the side frame side connecting member to the side frame, in a position closer to a cross portion of the cross portions.

6. The motor supporting structure according to claim 1 wherein
    the motor has a motor rotational shaft in the vehicle width direction, and
    the motor supporting member elastically supports a part of an end portion in the vehicle width direction of the motor at a position spaced apart radially from the motor rotational shaft.

7. The motor supporting structure according to claim 6 wherein the motor supporting member elastically supports, when viewed from above the vehicle body, a portion of the motor which is on more vehicle body front side than the motor rotational shaft.

8. The motor supporting structure according to claim 1 wherein the motor supporting member includes:
    a first motor supporting member fixed to both of the left side frame and the front cross frame,
    a second motor supporting member fixed to both of the right side frame and the front cross frame, and
    the motor supporting structure further includes a third motor supporting member which is fixed to the rear cross frame and elastically supports a rear side of the motor by way of an elastic body included in the third motor supporting member.

9. The motor supporting structure according to claim 8 wherein a fixing point of the third supporting member to the motor is disposed on an upper side relative to a fixing point of each of the first and second supporting members to the motor.

* * * * *